United States Patent
Ikenoue et al.

(10) Patent No.: US 12,518,662 B2
(45) Date of Patent: Jan. 6, 2026

(54) IMAGE DISPLAY SYSTEM, HEAD-MOUNTED DISPLAY, AND IMAGE DISPLAY METHOD WITH BRIGHTNESS ADJUSTMENT CONTROL

(71) Applicant: SONY INTERACTIVE ENTERTAINMENT INC., Tokyo (JP)

(72) Inventors: Shoichi Ikenoue, Chiba (JP); Kenichiro Yokota, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/564,605

(22) PCT Filed: Jun. 6, 2022

(86) PCT No.: PCT/JP2022/022764
§ 371 (c)(1),
(2) Date: Nov. 27, 2023

(87) PCT Pub. No.: WO2023/276565
PCT Pub. Date: Jan. 5, 2023

(65) Prior Publication Data
US 2024/0379030 A1   Nov. 14, 2024

(30) Foreign Application Priority Data
Jun. 28, 2021 (JP) .................. 2021-106796

(51) Int. Cl.
*G09G 3/00* (2006.01)
*G06F 3/01* (2006.01)

(52) U.S. Cl.
CPC ............ *G09G 3/001* (2013.01); *G06F 3/012* (2013.01); *G09G 2320/0606* (2013.01);
(Continued)

(58) Field of Classification Search
CPC .......... G09G 3/001; G09G 2320/0606; G09G 2320/0626; G09G 2340/125; G09G 2354/00; G06F 3/012
See application file for complete search history.

(56) References Cited

U.S. PATENT DOCUMENTS

2016/0125846 A1* 5/2016 Xu ................ G09G 5/10
  368/240
2017/0336851 A1   11/2017 Bae et al.
(Continued)

FOREIGN PATENT DOCUMENTS

CN    106157930 A    11/2016
JP    2002189464 A    7/2002
(Continued)

OTHER PUBLICATIONS

International Search Report for corresponding international application No. PCT/JP2022/022764, dated Aug. 16, 2022, pp. 1-6.
(Continued)

*Primary Examiner* — David D Davis
(74) *Attorney, Agent, or Firm* — Kilpatrick Townsend & Stockton LLP

(57) ABSTRACT

An image generation device 200 processes content to draw an image (step S22), and corrects the image as needed for display (step S24). When drawing the image, the image generation device 200 adjusts a tone curve according to a user operation for adjusting the brightness expressed by pixel values (step S20). A head-mounted display 100 generates a drive voltage corresponding to the pixel values of image data acquired from the image generation device 200 (step S28) and drives a display panel to display the image (step S30). When generating the drive voltage, the head-mounted display 100 decreases the drive voltage to a ratio
(Continued)

based on a user operation for reducing light emission brightness of the display panel (step S26).

15 Claims, 8 Drawing Sheets

(52) U.S. Cl.
CPC ............... *G09G 2320/0626* (2013.01); *G09G 2340/125* (2013.01); *G09G 2354/00* (2013.01)

(56) References Cited

U.S. PATENT DOCUMENTS

| | | | | |
|---|---|---|---|---|
| 2018/0318704 | A1* | 11/2018 | Ikenoue | G02B 27/00 |
| 2018/0361240 | A1* | 12/2018 | Ikenoue | A63F 13/53 |
| 2020/0098335 | A1* | 3/2020 | Chen | G09G 5/10 |
| 2020/0135139 | A1* | 4/2020 | Nishizawa | G06V 20/20 |
| 2021/0082373 | A1* | 3/2021 | Lou | G09G 5/10 |
| 2021/0089150 | A1 | 3/2021 | Wang et al. | |
| 2021/0327329 | A1* | 10/2021 | Chen | G09G 3/20 |

FOREIGN PATENT DOCUMENTS

| | | | |
|---|---|---|---|
| JP | 2008048234 | A | 2/2008 |
| JP | 2008089934 | A * | 4/2008 |
| JP | 2018-180316 | A | 11/2018 |
| JP | 2020-052787 | A | 4/2020 |
| JP | 2020-112982 | A | 7/2020 |
| JP | 2020-134705 | A | 8/2020 |
| WO | 2020/105269 | A1 | 5/2020 |

OTHER PUBLICATIONS

Decision to Grant a Patent for corresponding Japanese application No. 2021-106796, dated Mar. 25, 2025, pp. 1-4.

* cited by examiner

FIG.4
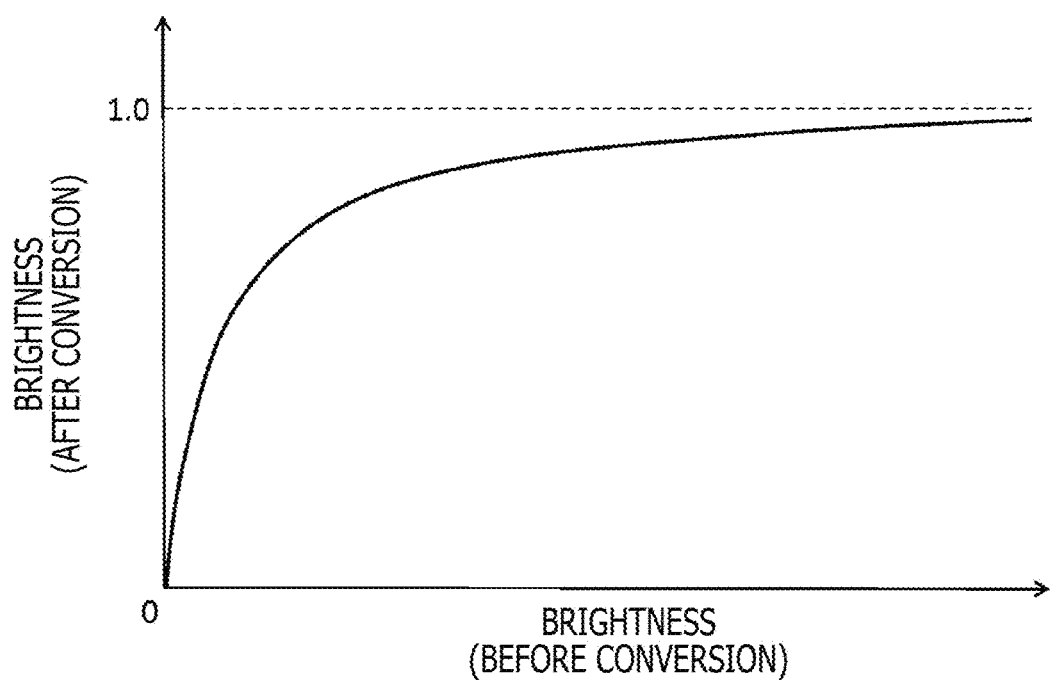
FIG.5
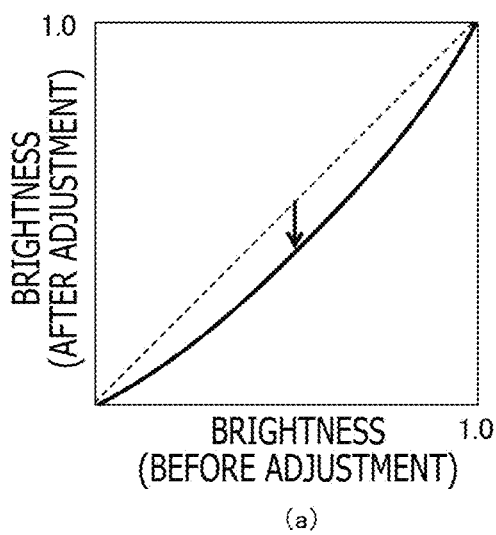
(a)
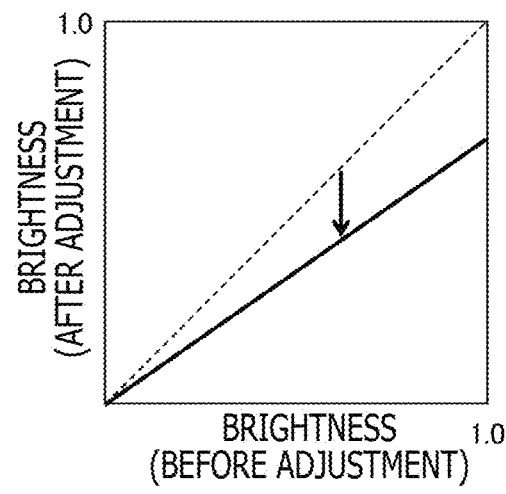
(b)

IMAGE DISPLAY SYSTEM, HEAD-MOUNTED DISPLAY, AND IMAGE DISPLAY METHOD WITH BRIGHTNESS ADJUSTMENT CONTROL

TECHNICAL FIELD

The present invention relates to an image display system, a head-mounted display, and an image display method that are used to display content images.

BACKGROUND ART

Various technologies have been developed to improve the image quality of displayed images such as television broadcasts and distributed videos. In recent years, a technology for processing an HDR (High Dynamic Range) signal, which provides an expanded range of brightness, is becoming widespread in addition to a technology for improving color gamut and resolution. Compared to a conventional SDR (Standard Dynamic Range), the HDR increases a brightness tolerance range approximately 100-fold. Therefore, objects that may be perceived as glary in the real world, such as reflected light from sunlight, can be expressed more realistically in images as well by using the HDR. When the HDR is used for expression not only in the television broadcasts and distributed videos but also in the world of computer graphics such as game images, the HDR is able to add reality to virtual worlds.

Meanwhile, systems capable of expressing a realistic image world by detecting the movement of the head of a user wearing a head-mounted display and representing a display target space in a corresponding field of view are becoming widespread. Further, walk-through systems have also been developed to allow a user wearing a head-mounted display to virtually walk around a space displayed as an image by physically moving around.

SUMMARY

Technical Problem

Due to the structure of a head-mounted display in which a display panel is located directly in front of the eyes of a user, emitted light can be an excessive visual stimulus, causing a viewer to experience uncontrollable glare and, in some cases, causing health hazards. Meanwhile, depending on content, there is a demand for utilizing a wide brightness range, such as the HDR, as much as possible to create and enjoy images with a richer expression. Achieving a suitable balance between the demand for expanding the brightness range and the demand for reducing the brightness range to avoid health hazards is becoming increasingly important as brightness range options become more diverse.

The present invention has been made in view of the above circumstances. An object of the present invention is to provide a technology that is capable of displaying images within an optimal brightness range for each piece of content while avoiding health hazards caused by light emitted from a display panel.

Solution to Problem

An aspect of the present invention relates to an image display system. The image display system includes an image generation device and a head-mounted display. The image generation device processes content to generate a display image. The head-mounted display displays the generated display image. The image generation device includes a brightness adjustment reception section and a brightness conversion section. The brightness adjustment reception section receives a user operation for adjusting brightness expressed by pixel values of the display image. The brightness conversion section converts the brightness expressed by the pixel values of the display image in accordance with rules regarding contents of the user operation received by the brightness adjustment reception section. The head-mounted display includes a brightness reduction operation reception section and a light emission brightness control section. The brightness reduction operation reception section receives a user operation for reducing light emission brightness of a display panel displaying the display image. The light emission brightness control section controls the light emission brightness of the display panel in accordance with rules regarding contents of the user operation received by the brightness reduction operation reception section.

Another aspect of the present invention relates to a head-mounted display. The head-mounted display includes a display section, a brightness reduction operation reception section, and a light emission brightness control section. The display section causes a display panel to display an image with light emission brightness corresponding to pixel values. The brightness reduction operation reception section receives a user operation for reducing light emission brightness of the display panel. The light emission brightness control section decreases the light emission brightness to a predetermined ratio according to the user operation.

Still another aspect of the present invention relates to an image display method. The image display method includes a step of causing an image generation device to process content to generate a display image, a step of causing the image generation device to receive a user operation for adjusting brightness expressed by pixel values of the display image, a step of causing the image generation device to convert the brightness expressed by the pixel values of the display image in accordance with rules regarding contents of the user operation for adjusting the brightness expressed by the pixel values, a step of causing a head-mounted display to receive a user operation for reducing light emission brightness of a display panel displaying the display image, and a step of causing the head-mounted display to control the light emission brightness of the display panel in accordance with rules regarding contents of a user operation for reducing the light emission brightness.

Any combinations of the abovementioned component elements and any conversions of expressions of the present invention between, for example, methods, devices, systems, computer programs, data structures, and recording media are also effective as the aspects of the present invention.

Advantageous Effect of Invention

The present invention is able to display images within an optimal brightness range for each piece of content while avoiding health hazards caused by light emitted from a display panel.

BRIEF DESCRIPTION OF DRAWINGS

FIG. 4 is a diagram illustrating a conversion function that is used for tone mapping in step S10 of FIG. 3.

FIG. 5 is a diagram illustrating the comparison of brightness change characteristics between brightness adjustment of pixel values and brightness adjustment of light emitted from a display panel.

DESCRIPTION OF EMBODIMENT

Figure 1:
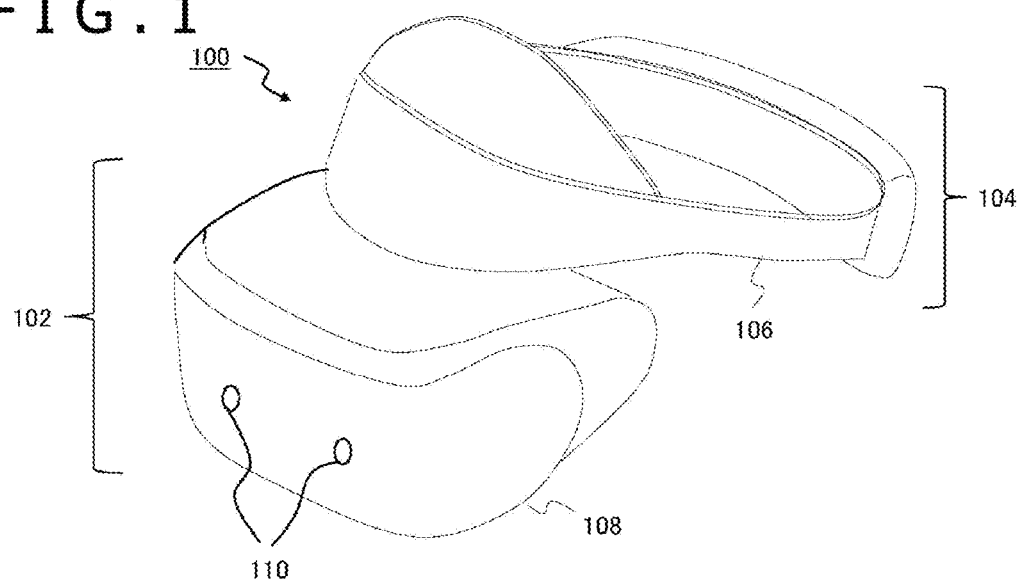
FIG. 1 is a diagram illustrating an example of the appearance of a head-mounted display according to the present embodiment.

FIG. 1 illustrates an example of the appearance of a head-mounted display 100. In the illustrated example, the head-mounted display 100 includes an output mechanism section 102 and a mounting mechanism section 104. The mounting mechanism section 104 includes a mounting band 106 that fastens the head-mounted display 100 to the whole circumference of the head of a user when the user wears the head-mounted display 100. The output mechanism section 102 includes a housing 108 and a display panel. The housing 108 is shaped so as to cover the left and right eyes of the user when the user wears the head-mounted display 100. The display panel is disposed inside the housing 108 so as to face the eyes of the user when the user wears the head-mounted display 100.

Further, the housing 108 includes an eyepiece that is positioned between the display panel and the user's eyes and configured to expand the user's viewing angle. The head-mounted display 100 may additionally include speakers and earphones that are positioned to match the ears of the user when the user wears the head-mounted display 100. Furthermore, the head-mounted display 100 includes a built-in motion sensor to detect translational motions and rotational motions of the head of the user wearing the head-mounted display 100, and eventually detect the location and posture of the user's head at each time point.

In the example depicted in FIG. 1, the head-mounted display 100 includes a stereo camera 110. The stereo camera 110, which is mounted on the front surface of the housing 108, captures a video image of the surrounding real space in the field of view corresponding to the gaze of the user. When the captured image is immediately displayed, what is called video see-through is achieved to enable the user to view the real space in the direction in which the user faces. Further, AR (Augmented Reality) is implemented when a virtual object is drawn on the image of a real object depicted in the captured image.

Figure 2:
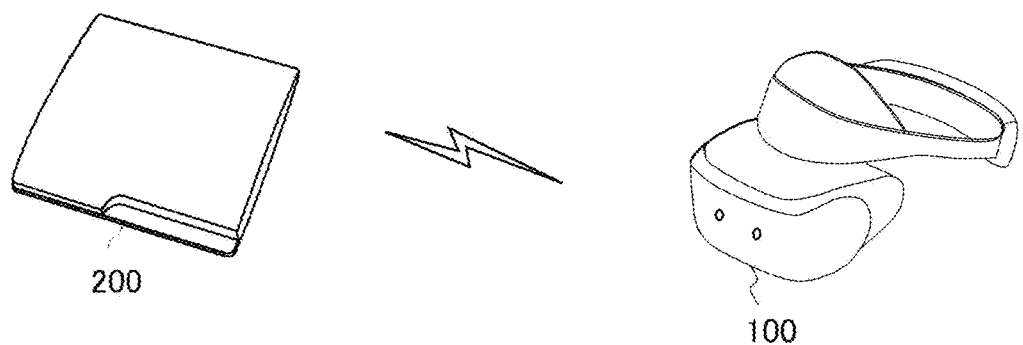
FIG. 2 is a diagram illustrating an example configuration of an image display system according to the present embodiment.

FIG. 2 illustrates an example configuration of an image display system according to an embodiment of the present invention. The head-mounted display 100 is connected to an image generation device 200 through wireless communication or through an interface for connecting to a USB (Universal Serial Bus) or another peripheral device. The image generation device 200 may be further connected to a server through a network. In a case where the image generation device 200 is connected to the server through the network, the server may provide the image generation device 200 with a game or other online application in which multiple users are able to participate through the network.

The image generation device 200 determines the position of a user's viewpoint and the direction of a user's gaze according to the location and posture of the head of the user wearing the head-mounted display 100, generates a display image so as to provide a corresponding field of view, and outputs the generated display image to the head-mounted display 100. For example, the image generation device 200 may generate the display image representing a virtual world that serves as a stage of an electronic game while allowing the electronic game to progress, or display a still or moving image to provide a viewing experience or deliver information no matter whether the virtual world or the real world is depicted in the display image. Further, displaying a panoramic image in a wide angle of view centered on the user's viewpoint makes the user feel like being immersed in a displayed world.

Some or all of the functions of the image generation device 200 may be implemented in the head-mounted display 100. In a case where all of the functions of the image generation device 200 are implemented in the head-mounted display 100, the image processing system depicted in FIG. 2 is implemented by one head-mounted display 100.

Figure 3:
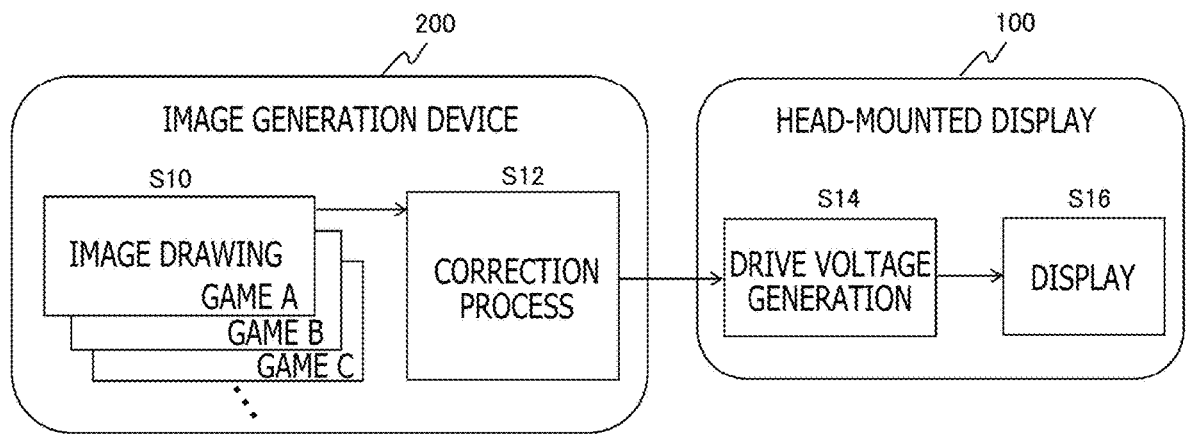
FIG. 3 is a diagram illustrating an overview of the flow of image display processing that is performed by the image display system according to the present embodiment.

FIG. 3 illustrates an overview of the flow of image display processing that is performed by the image display system according to the present embodiment. First of all, the image generation device 200 draws an image in accordance with a program of content to be processed (step S10). Typically, the image generation device 200 generates a moving image by continuously drawing images at a predetermined rate. In this instance, the image generation device 200 successively generates images corresponding to the user's gaze by determining the field of view of the image according to latest information regarding the location and posture of the head-mounted display 100, that is, the user's head.

The processing in step S10 is defined for each piece of content. In FIG. 3, the processing is represented by individual rectangles for various pieces of content, such as "Game A," "Game B," and "Game C." When the processing in step S10 is performed, brightness values of R, G, and B are given, as pixel values, to individual pixels forming an image plane. In this instance, the image generation device 200 may perform, for example, a tone mapping process and the like in order to convert the pixel values, which are determined by detailed calculations, such as ray tracing, to appropriate values falling within a displayable brightness range.

Next, the image generation device 200 performs a correction process on the drawn images as needed for displaying them (step S12). When the head-mounted display 100 is used as a display destination, the image generation device 200 performs distortion correction and reprojection in step S12. The distortion correction is a correction made to distort an original image in the opposite direction according to distortion aberration so that an undistorted image is visible when viewed through the eyepiece included in the head-mounted display 100. The reprojection is a correction process performed to update the field of view of an image in consideration of the movement of the user's head during the elapsed time since the beginning of drawing in step S10.

The image generation device 200 additionally performs color gamut conversion, as needed, depending on display characteristics of the head-mounted display 100. The head-mounted display 100 sequentially receives data of images corrected as described above and generates a drive voltage corresponding to the brightness of R, G, and B expressed by the pixel values (step S14). Before the transmission of image data from the image generation device 200 to the head-mounted display 100, general processing, such as quantization or inverse quantization of pixel values, may be performed. Subsequently, the head-mounted display 100 sequentially displays the images by driving the display panel by the generated drive voltage (step S16).

FIG. 4 illustrates a conversion function (hereinafter referred to as a "tone curve") that is used for tone mapping in step S10 of FIG. 3. FIG. 4 depicts the Reinhard function, which is a typical tone curve, and in consideration of human visual characteristics, achieves conversion for reducing gradation from a low-brightness region to a high-brightness region. Properly setting and selecting a tone curve makes it possible to similarly display the images in a color tone intended by a content creator even if a change occurs in the characteristics of a display at the display destination or in a corresponding brightness range.

Incidentally, the brightness range of the images obtained in step S10 of FIG. 3 varies with the contents of content and with the intention of the content creator, that is, varies depending, for example, on whether rich visual representation is to be provided by using an HDR or whether simple visual representation is to be provided without using different brightness levels. Even in a case where one piece of content is handled, the brightness range may significantly vary from one scene to another. When the brightness range that can be handled by display devices expands, the brightness range for content expression becomes increasingly diverse.

Meanwhile, especially in a case of the head-mounted display 100, it is necessary to consider the magnitude of influence that highly-bright light emission has on human physical conditions because of the structure in which the display panel's light emission is viewed closely. Light sensitivity varies depending on the user. Therefore, for content creators who want to express images in the widest possible brightness range, it is difficult to set such a brightness range. Since avoiding health hazards is a must-achieve goal, images are created with a narrow brightness range (setting of image generation rules within the content) for safety reasons. As a result, a problem arises where rich image display technologies utilizing a wide brightness range do not readily become widespread.

On the assumption that the user individually adjusts the light emission brightness of the display panel by using, for example, a brightness adjustment button, as is the case with television receivers and common monitors, the degree of freedom in setting brightness increases when creating content. However, in this case, a single brightness adjustment is also reflected in images of other scenes and content that are subsequently displayed. For example, if the brightness is adjusted to be reduced when displaying a bright image, it may become difficult to view images of dark scenes or content whose brightness range is originally set to be narrow. In this case, the user is forced to adjust the brightness of each scene and each piece of content.

Further, even if the brightness is reduced when displaying a bright image, there is no guarantee that a brighter image will not be displayed to cause discomfort or health hazards due to glare. Furthermore, if uniform brightness control is exercised regardless of content, the characteristics of content, such as a detailed representation of important objects in a specific brightness range, may be lost to cause a discrepancy between the quality of user's video experience and the intention of a content creator.

Accordingly, it is conceivable that, each time the light emission brightness of the display panel is adjusted, information regarding such brightness adjustment may be fed back to the image generation device 200 and reflected in the brightness expressed by the pixel values of a drawn image. For example, in response to an operation performed to reduce the brightness of the display panel, the image generation device 200 expands the brightness range of pixel values for a scene or content whose brightness range is originally set low. This makes it possible to avoid a problem where dark portions are not easily visible due to reduced brightness of the display panel.

In addition, by expanding the brightness range of pixel values only in portions that the content creator wants to focus on, detailed settings for each piece of content can be made, such as setting portions where the brightness adjustment of the display panel is reflected as is and setting portions where it is not. However, in this case, when creating content, it is necessary to assume all possible settings provided by the display panel and create conversion rules for the brightness expressed by pixel values. That is, in a case where the brightness of the display panel can be adjusted to n levels, the number of man-hours for image quality adjustment and quality assurance during content creation will increase by n times.

Therefore, in the present embodiment, the roles are clearly divided into brightness adjustment of pixel values of a drawn image and brightness adjustment of light emission from the display panel, and each adjustment is made independently. FIG. 5 illustrates the comparison of brightness change characteristics between the brightness adjustment of pixel values and the brightness adjustment of light emission from the display panel. Part (a) and part (b) of FIG. 5 use a dotted line to indicate the brightness before adjustment and use a thick line to indicate the dependence of change on original brightness in a case where the brightness is adjusted in the direction of reducing the brightness. Part (a) illustrates how brightness changes in a case where the brightness expressed by pixel values is reduced by tone mapping during image drawing in the image generation device 200.

In a case where the adjustment is made by tone mapping, the rate of brightness reduction changes depending on the original brightness. Generally, the rate of brightness reduction is maximized in an intermediate brightness region, and the brightness change becomes smaller when the brightness becomes closer to the minimum or maximum brightness. According to these characteristics, the overall brightness range may remain unchanged, and the brightness may not decrease significantly in high-brightness portions. Part (b) of FIG. 5 illustrates how brightness changes in a case where the light emission brightness of the display panel is reduced. In this case, the brightness uniformly decreases at a constant rate from the original brightness. As a result, the brightness range itself is reduced so that the maximum brightness of an image definitely decreases no matter what the brightness range is.

In the present embodiment, the above-described characteristics are utilized to adjust the light emission brightness of the display panel for the purpose of avoiding discomfort and health hazards caused by glare. That is, in a case where unexpected glare occurs due, for instance, to a sudden change in the brightness range of an image, the brightness range can be definitely reduced by quickly reducing the light emission brightness to a predetermined ratio with a simple operation by the user. Meanwhile, the pursuit of brightness matching the user's preference can be performed with respect to the pixel values of a drawn image. Since a drawing process is defined within the content, adjustments are made within the scope of the intention of the content creator. This prevents an image world and image quality from being damaged by careless adjustments.

Figure 6:
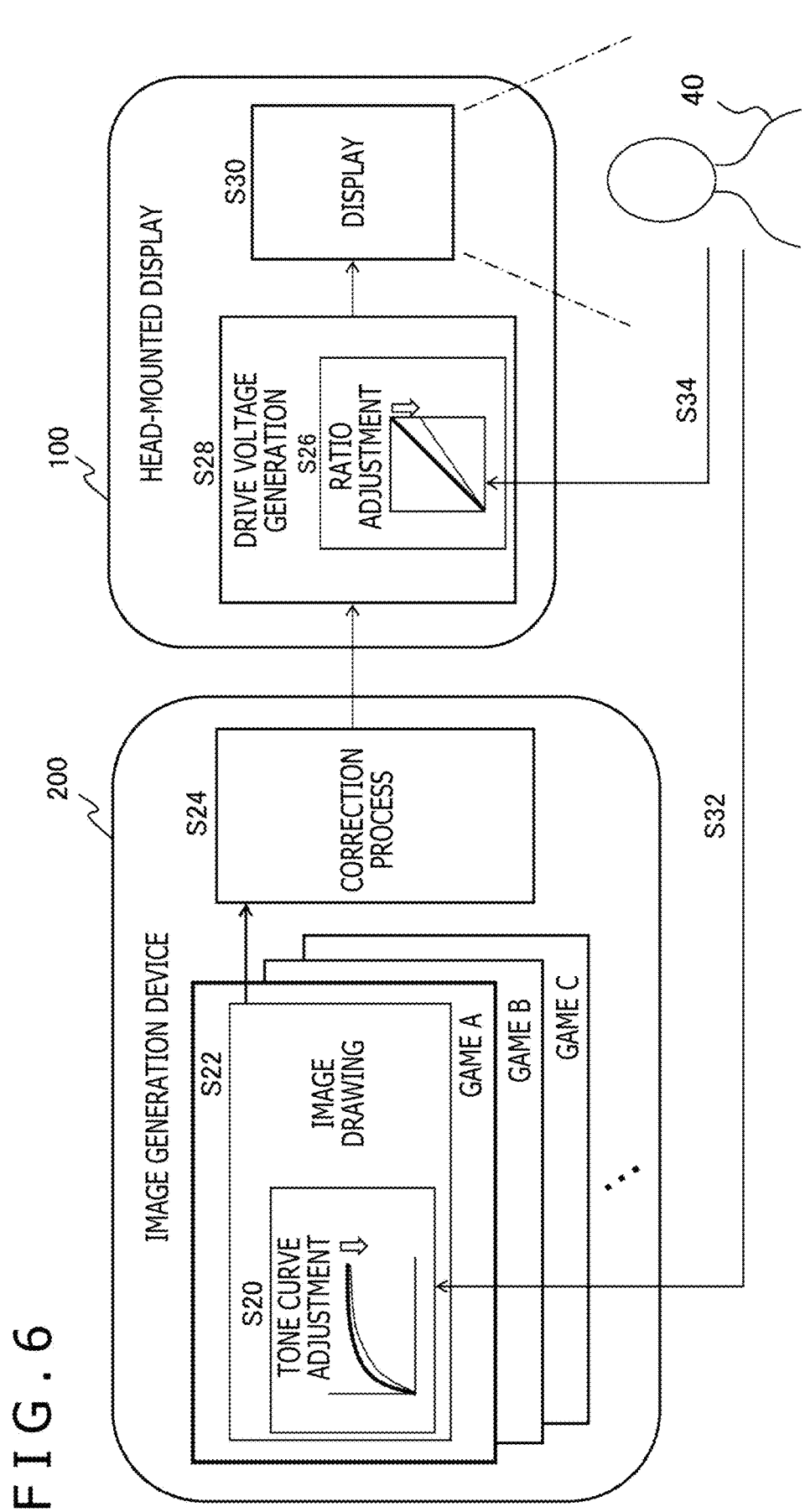
FIG. 6 is a diagram illustrating the flow of image display processing that is performed by an image generation device and the head-mounted display when an adjustment mechanism is introduced according to the present embodiment.

FIG. 6 illustrates the flow of image display processing that is performed by the image generation device 200 and the head-mounted display 100 when an adjustment mechanism is introduced. This processing procedure is basically formed by adding tone curve adjustment (step S20) to image drawing processing (step S22) of the image generation device 200 in the processing procedure illustrated in FIG. 3 and adding ratio adjustment (step S26) to drive voltage generation (step S28) of the head-mounted display 100 in the processing procedure illustrated in FIG. 3. More specifically, the image generation device 200 adjusts the tone curve for adjusting the brightness expressed by pixel values determined by drawing calculation in response to a brightness adjustment operation by the user 40. A correction process (step S24) depicted in FIG. 6 is similar to the correction process (step S12) depicted in FIG. 3.

When generating the drive voltage for the display panel, the head-mounted display 100 reduces the drive voltage as needed by multiplying the drive voltage by a ratio lower than 1.0, which corresponds to the level of brightness adjustment by the user 40. A display process (step S30) depicted in FIG. 6 is similar to the display process (step S16) depicted in FIG. 3. At a given time point, the user 40 calls an adjustment mechanism provided by currently executed content and adjusts the brightness range of the pixel values (step S32). Further, if the user 40 feels a sudden glare while viewing content images, the user 40 reduces the brightness by using an adjustment mechanism provided by the head-mounted display 100 (step S34).

By selectively using the two adjustment mechanisms according to an intended purpose, the user is able to complete internal processes for image drawing (step S22) and drive voltage generation (step S28), respectively. Stated differently, the brightness adjustments made by the two adjustment mechanisms do not interfere with each other. As a result, when the brightness expressed pixel values is to be adjusted in the image generation device 200, there is no need to take into account the characteristics related to the adjustment of the display panel of the head-mounted display 100. Further, when the brightness of the display panel is to be adjusted in the head-mounted display 100, there is no need to consider whether or not the brightness expressed by pixel values is adjusted within the content and to consider how the brightness adjustment is implemented.

Even if these processes are independent, by limiting the purpose of each process and using the processes in a complementary manner, it is possible to avoid health hazards and display images in the best possible quality for satisfying both content creator's concerns and user's preferences. Here, reducing the brightness of the display panel for the purpose of avoiding health hazards is considered to be an operation under relatively special circumstances and, furthermore, an operation for a limited period of time. Stated differently, it is guaranteed that the light emission brightness of the display panel will not be reduced unless the need arises. Therefore, the content creator only has to optimize image composition and adjustment mechanism on the premise that the light emission brightness of the display panel is not reduced.

Hereinafter, a state in which the light emission brightness of the display panel is not reduced will be referred to as the "normal mode," and a state in which the light emission brightness of the display panel is reduced will be referred to as the "brightness reduction mode." The means for adjusting the brightness expressed by pixel values in the image generation device 200 is not limited to changing the tone curve. However, when brightness adjustment is achieved by using the tone curve, a conventional brightness conversion mechanism can be utilized for ease of introduction.

Further, the means for adjusting the brightness of the display panel is not limited to simply multiplying the drive voltage by the same ratio. For example, the brightness value or range may be multiplied by a different ratio, and the light emission brightness may be controlled by using a conversion function or lookup table that can reduce the drive voltage in a high-brightness region. However, in the following explanation, the drive voltage will be multiplied by a ratio k (hereinafter referred to as the "output ratio") where k=1.0 in the normal mode and 0<k<1.0 in the brightness reduction mode.

Figure 7:
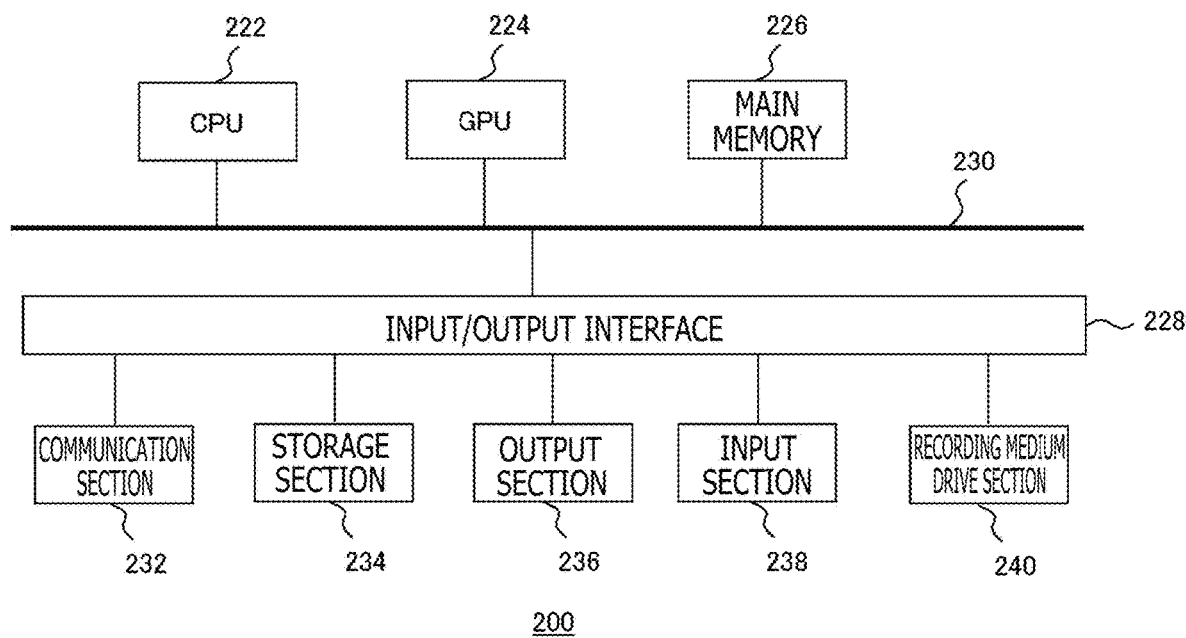
FIG. 7 is a diagram illustrating an internal circuit configuration of the image generation device according to the present embodiment.

FIG. 7 illustrates an internal circuit configuration of the image generation device 200. The image generation device 200 includes a CPU (Central Processing Unit) 222, a GPU (Graphics Processing Unit) 224, and a main memory 226. These parts are interconnected with each other through a bus 230. The bus 230 is further connected to an input/output interface 228.

The input/output interface 228 is connected to a communication section 232, a storage section 234, an output section 236, an input section 238, and a recording medium drive section 240. The communication section 232 includes a peripheral device interface such as a USB or an IEEE (Institute of Electrical and Electronics Engineers) 1394 interface, and a wired or wireless LAN (Local Area Network) network interface. The storage section 234 is formed, for example, by a hard disk drive or a non-volatile memory. The output section 236 outputs data to the head-mounted display 100. The input section 238 inputs data from the head-mounted display 100. The recording medium drive section 240 drives a removable recording medium such as a magnetic disk, an optical disk, or a semiconductor memory.

The CPU 222 provides overall control of the image generation device 200 by executing an operating system stored in the storage section 234. Further, the CPU 222 executes various programs that are either read from the removable recording medium and loaded into the main memory 226 or downloaded through the communication section 232. The GPU 224 functions as a geometry engine and as a rendering processor, performs a drawing process according to a drawing instruction from the CPU 222, and outputs the result of the drawing process to the output section 236. The main memory 226 includes a RAM (Random Access Memory) and stores programs and data necessary for processing.

Figure 8:
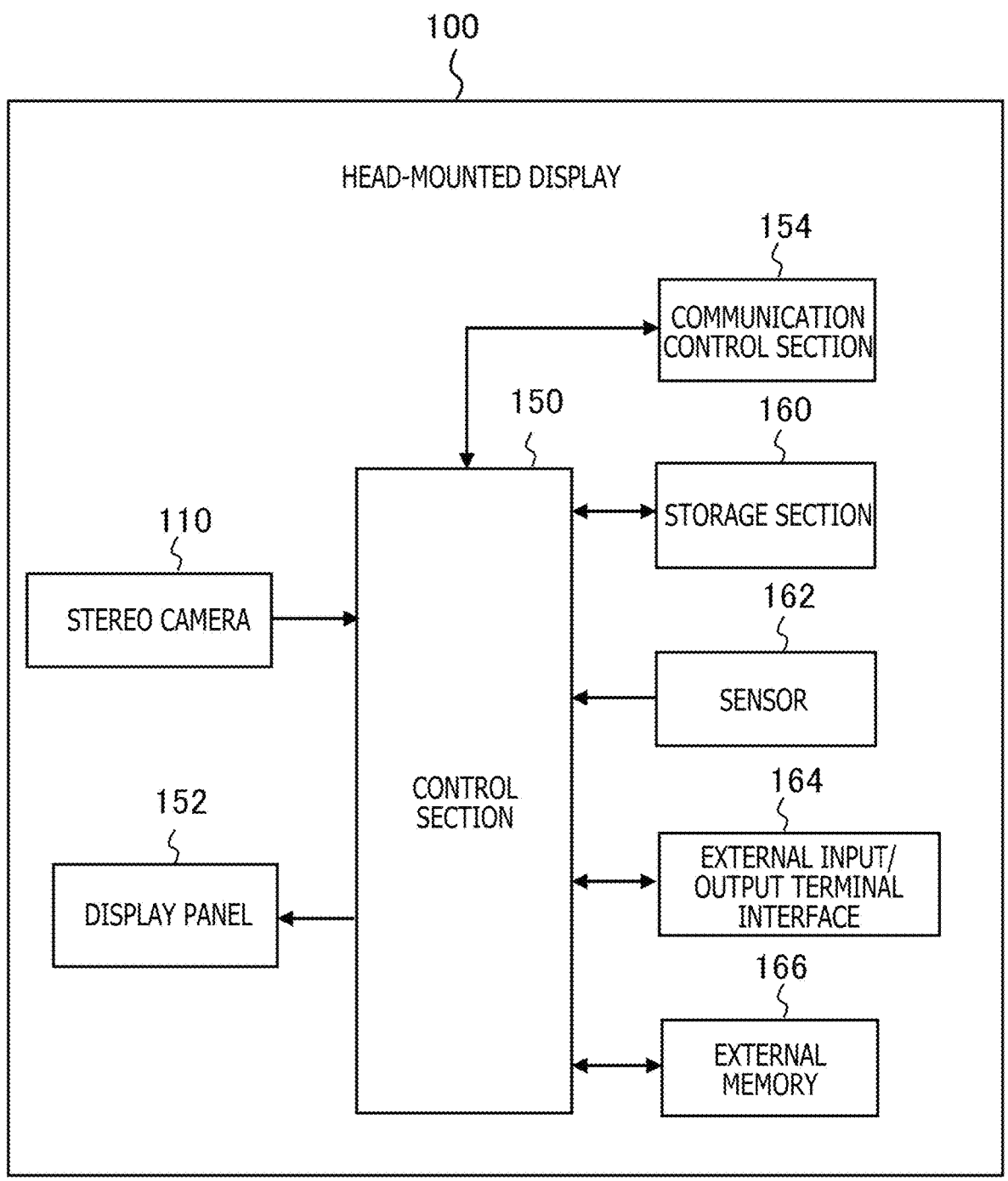
FIG. 8 is a diagram illustrating an internal configuration of the head-mounted display according to the present embodiment.

FIG. 8 illustrates an internal configuration of the head-mounted display 100. A control section 150 is a main processor that processes and outputs signals such as an image signal and a sensor signal, instructions, and data. The stereo camera 110 supplies data of captured images at a predetermined rate to the control section 150. A display panel 152 includes a luminous panel such as a liquid crystal or an organic EL (Electro-Luminescence) panel, and its control mechanism, receives an image signal from the control section 150, and displays an image represented by the received image signal.

A communication control section 154 establishes wired or wireless communication through an undepicted network adapter or an antenna, and transmits data inputted from the control section 150 to the outside. Further, the communication control section 154 establishes wired or wireless communication through the network adapter or the antenna, receives data from the outside, and outputs the received data to the control section 150. A storage section 160 temporarily stores, for example, data, parameters, and operating signals to be processed by the control section 150.

A sensor 162 includes a motion sensor, measures posture information regarding, for example, the rotation angle and tilt of the head-mounted display 100, and successively supplies the measured posture information to the control section 150. Further, the sensor 162 includes, as needed, for example, a vibration sensor and a microphone. The vibration sensor is used to detect when the user taps the head-mounted display 100 and detect the number of times the user taps the head-mounted display 100. The microphone is used to acquire data of a voice spoken by the user. Also in this case, the sensor 162 successively supplies various acquired information to the control section 150.

An external input/output terminal interface 164 is an interface for connecting to a peripheral device such as a USB controller. An external memory 166 is, for example, a flash memory used as an external memory. The control section 150 is able to supply images and sound data to the display panel 152 and undepicted earphones and speakers and cause the display panel 152 and the earphones and speakers to output the images and sound data, and supply the images and sound data to the communication control section 154 and cause the communication control section 154 to output the images and sound data to the outside.

Figure 9:
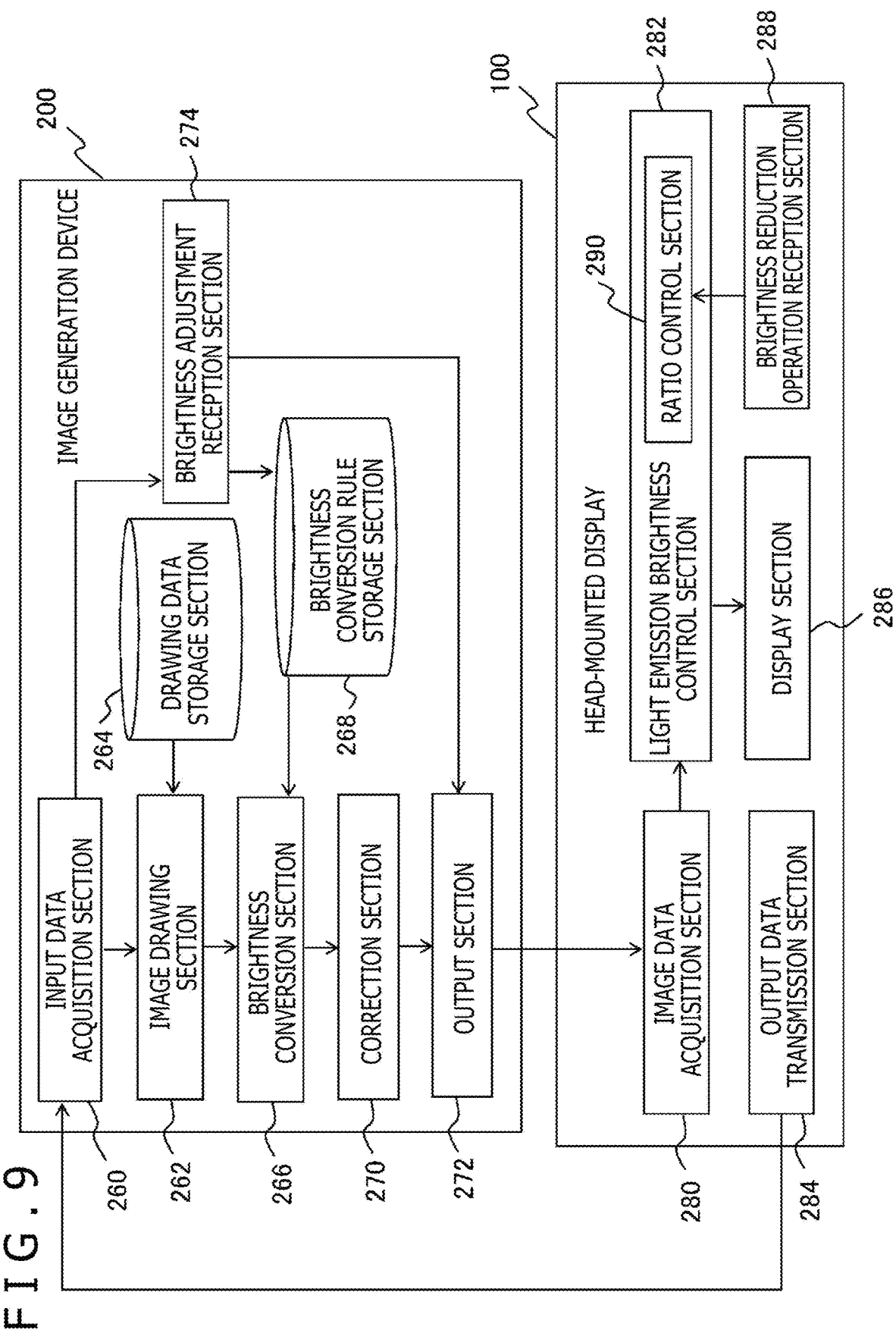
FIG. 9 is a diagram illustrating a configuration of functional blocks of the image generation device and head-mounted display according to the present embodiment.

FIG. 9 illustrates a configuration of functional blocks of the image generation device 200 and head-mounted display 100 according to the present embodiment. The image generation device 200 may perform general information processing, as mentioned earlier, in order to communicate with the server and allow an electronic game to progress. However, FIG. 9 particularly focuses on the functions of generating the display image. At least some of the functions of the image generation device 200 depicted in FIG. 9 may be implemented in the head-mounted display 100. Alternatively, at least some of the functions of the image generation device 200 depicted in FIG. 9 may be implemented in the server that is connected to the image generation device 200 through the network.

Further, the functional blocks depicted in FIG. 9 can be implemented by hardware including, for example, a CPU, a GPU, a control section, various memories, and sensors or may be implemented by software including a program that has various functions, such as data input, data retention, image processing, and communication functions, and is loaded into a memory, for example, from a recording medium. Therefore, it will be understood by persons skilled in the art that the functional blocks may be variously implemented by hardware only, by software only, or by a combination of hardware and software. The method for implementing the functional blocks is not particularly limited.

The image generation device 200 includes an input data acquisition section 260, an image drawing section 262, a drawing data storage section 264, a brightness conversion section 266, a brightness conversion rule storage section 268, a correction section 270, an output section 272, and a brightness adjustment reception section 274. The input data acquisition section 260 acquires data transmitted from the head-mounted display 100. The image drawing section 262 draws images of content. The drawing data storage section 264 stores data necessary for drawing. The brightness conversion section 266 converts brightness given as pixel values. The brightness conversion rule storage section 268 stores brightness conversion rules. The correction section 270 makes corrections for display purposes. The output section 272 outputs corrected image data to the head-mounted display 100. The brightness adjustment reception section 274 receives brightness adjustment operations from the user.

The input data acquisition section 260 acquires values measured by the motion sensor, images captured by the stereo camera 110, and other data transmitted from the head-mounted display 100 at a predetermined rate. Additionally, from the head-mounted display 100 and an undepicted input device, the input data acquisition section 260 acquires the contents of a user operation performed to adjust the brightness expressed by pixel values. The image drawing section 262 acquires information regarding the location and posture of the head-mounted display 100 at a predetermined rate and draws an image of a display target in the field of view corresponding to the acquired information.

The above-described processing corresponds to the processing performed in step S22 of FIG. 6. More specifically, the image drawing section 262 determines the pixel values, which represent R, G, and B elements, by performing, for example, ray tracing or rasterization in accordance with the program of currently executed content. The drawing data storage section 264 stores model data of an object, data related to the composition of a display world, and other data necessary for image drawing. The image drawing section 262 may perform a process of generating images, namely, a process of drawing images by computer graphics, a process of decoding and decompressing live-action video data, or a process of combining live-action video images and computer graphics images.

The brightness conversion section 266 converts the brightness range of pixel values obtained as a result of drawing to a brightness range suitable for the display panel of the head-mounted display 100. This processing corresponds to tone mapping in step S20 of FIG. 6. However, as mentioned earlier, the means adopted by the brightness conversion section 266 to convert the brightness range is not limited to tone mapping. The brightness conversion rule storage section 268 stores rules that are followed by the brightness conversion section 266 to convert brightness. When the brightness conversion section 266 performs tone mapping, the brightness conversion rule storage section 268 stores the tone curve to be used for such tone mapping.

The brightness conversion section 266 functions in a case where there is a mismatch between the brightness range of images drawn by the image drawing section 262 and the brightness range that can be provided by the head-mounted display 100 and in a case where a mechanism enabling the user to adjust brightness is provided in the normal mode. This adjustment mechanism is defined within content and may not be required depending on the content. The brightness conversion rule storage section 268 stores brightness conversion rules for each piece of content.

The correction section 270 corrects drawn images or brightness-converted images as needed for display, for example, by making distortion correction, reprojection, or color gamut correction. This correction processing corresponds to the processing performed in step S24 of FIG. 6. In a case where the display image is to be stereoscopically viewed, the correction section 270 may generate left- and right-eye images with parallax from the original reference image. Alternatively, the image drawing section 262 may directly generate the left- and right-eye images.

The output section 272 sequentially transmits, to the head-mounted display 100, data of corrected images supplied from the correction section 270. For stereoscopic viewing, the output section 272 transmits the data in such an order that the left-eye image is placed in the left half of the display image and that the right-eye image is placed in the right half of the display image. The brightness adjustment reception section 274 receives, from the user, the brightness adjustment in the normal mode, that is, the brightness adjustment of pixel values. Therefore, the brightness adjustment reception section 274 causes the head-mounted display 100 to display a screen for receiving the brightness adjustment through the output section 272.

The result of adjustment is stored in the brightness conversion rule storage section 268 and used for brightness conversion by the brightness conversion section 266. As mentioned earlier, the brightness adjustment reception section 274 can be omitted depending on the content. The purpose of brightness adjustment provided by the brightness adjustment reception section 274 is to obtain a brightness range that allows for comfortable viewing without any discomfort as intended by the content creator when the user views an image of target content through his or her head-mounted display 100.

For example, visual recognizability such as whether a dark-colored object is visually recognizable in a dark scene or whether a bright-colored object is visually recognizable in a bright scene, is determined by a combination of various factors such as the display panel of the head-mounted display 100, the contents of content, and the visual characteristics of the user. Therefore, when the user is allowed to actually check and adjust content images and images prepared for adjustment, the user is able to experience the image world in a better state. However, depending on the content, such adjustment may not have a large effect on the visual recognizability of images. Accordingly, the waste of creation man-hours can be avoided by allowing the content creator to decide whether or not the brightness adjustment reception section 274 is actually required.

The brightness adjustment reception section 274 displays a brightness adjustment screen as needed when, for example, content processing begins or the user makes a call, and receives adjustment operations for a given period of time. Therefore, broad rules regarding brightness conversion, which additionally affect, for example, image quality and color tone, such as brightness, sharpness, and gamma values, can be adjusted over an adequate span of time. Any of general image generation techniques may be introduced as a method for reflecting the results of such multifaceted adjustments in the brightness conversion rules.

The head-mounted display 100 includes an output data transmission section 284, an image data acquisition section 280, a light emission brightness control section 282, a display section 286, and a brightness reduction operation reception section 288. The output data transmission section 284 transmits, to the image generation device 200, data used for display image drawing and user's adjustments for the brightness adjustment reception section 274. The image data acquisition section 280 acquires image data transmitted from the image generation device 200. The light emission brightness control section 282 controls the light emission brightness of the display panel according to the image data. The display section 286 drives the display panel to display images. The brightness reduction operation reception section 288 receives a brightness reduction operation performed by the user.

The output data transmission section 284 transmits, to the image generation device 200, data required for display image drawing, such as images captured by the stereo camera 110 and values measured by the motion sensor included in the sensor 162. Further, the output data transmission section 284 successively transmits, to the image generation device 200, the contents of a user operation performed with respect to the brightness adjustment screen, which is displayed by the brightness adjustment reception section 274 of the image generation device 200. An undepicted input device may acquire the contents of a user operation regarding brightness adjustment and transmit the acquired contents to the image generation device 200.

The image data acquisition section 280 acquires image data transmitted from the image generation device 200. In this instance, the image data acquisition section 280 sequentially acquires pixel value data, which are transmitted, for example, in raster order from the image generation device 200, and supplies the acquired pixel value data to the light emission brightness control section 282. The light emission brightness control section 282 determines the drive voltage for light-emitting elements in the display panel according to the brightness of R, G, and B expressed by individual pixel values. This processing corresponds to the processing performed in step S28 of FIG. 6. The display section 286 uses the drive voltage generated by the light emission brightness control section 282 to display an image by sequentially causing the corresponding elements in the display panel to emit light. This processing corresponds to the processing performed in step S30 of FIG. 6.

The brightness reduction operation reception section 288 receives, from the user, an operation performed to adjust the light emission brightness of the display panel. The purpose of the brightness reduction operation reception section 288 is to avoid discomfort and health hazards caused by strong light. For example, even when the brightness expressed by pixel values is properly adjusted by the brightness adjustment reception section 274 of the image generation device 200, a scene expressed by brightness in a high-brightness region may suddenly appear. Further, depending on the content, the pixel value brightness adjustment mechanism itself may not be provided.

Thus, in order to be able to reduce the brightness definitely and immediately in any of these various situations, the brightness reduction operation reception section 288 preferably includes a user interface that achieves brightness reduction with a small number of operations. When the UI is used to perform a brightness reduction operation, information indicating the result of such an operation is transmitted from the brightness reduction operation reception section 288 to the light emission brightness control section 282. The light emission brightness control section 282 controls the light emission brightness of the display panel in accordance with rules regarding the contents of the brightness reduction operation. The light emission brightness control section 282 includes a ratio control section 290. In accordance with the contents of the brightness reduction operation, the ratio control section 290 changes the output ratio of a voltage that drives the display panel.

In the normal mode, the output ratio is 1.0. When the brightness reduction operation is performed, the ratio control section 290 changes the output ratio to a predetermined value smaller than 1.0. This processing corresponds to the processing performed in step S26 of FIG. 6 and makes a transition to the brightness reduction mode. However, as mentioned earlier, the brightness reduction means to be adopted by the light emission brightness control section 282 is not particularly limited as long as the light emission brightness of the display panel can be reduced. For example, the light emission brightness may be reduced by lowering the level of brightness expressed by the pixel values of image data transmitted from the image generation device 200.

Preferably, the rules for controlling the output ratio with respect to the brightness reduction operation are set in the ratio control section 290 so that the output ratio can be selected to decrease the maximum value of the light emission brightness to approximately 10 nits. The brightness reduction operation reception section 288 may receive a user operation that is performed to return reduced brightness to brightness corresponding to the normal mode. In this case, the ratio control section 290 detects such an operation and returns the output ratio to 1.0. Further, the ratio control section 290 may return the output ratio to 1.0 in response to a predetermined event such as a display target change to a different scene or different content.

Figure 10:
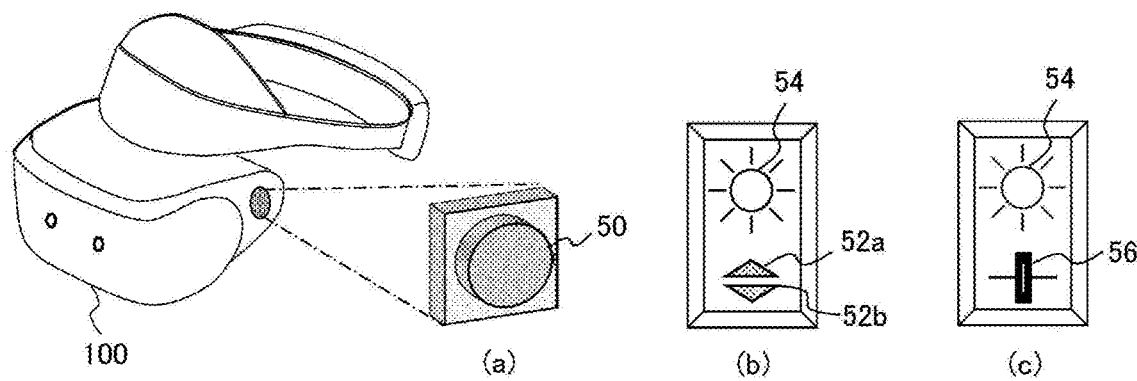
FIG. 10 is a diagram illustrating an example in which the UI (User Interface) of a brightness reduction operation reception section in the present embodiment is implemented as a hardware switch.

FIG. 10 illustrates an example in which the UI in the brightness reduction operation reception section 288 is implemented as a hardware switch. Part (a) of FIG. 10 illustrates an example of an emergency button that is formed by a single hardware button 50 that can be depressed. The emergency button is disposed at a place where the emergency button is easily operable by the user wearing the head-mounted display 100. In the example of FIG. 10, the emergency button is mounted on a lateral surface of the head-mounted display 100. For example, when the user depresses the emergency button once in the normal mode, the ratio control section 290 makes a transition to the brightness reduction mode by changing the output ratio to a predetermined value smaller than 1.0.

When the user depresses the emergency button again in the above state, the ratio control section 290 returns to the normal mode by changing the output ratio to 1.0. In this case, the light emission brightness is in either of two states, namely, the normal state and the reduced state, but the light emission brightness can be definitely reduced by a simple operation. Alternatively, by identifying variations in operation methods such as gradually decreasing the output ratio according to the number of depressions of the emergency button and returning to the normal mode by holding down the emergency button, the light emission brightness in the brightness reduction mode may be made adjustable to multiple levels.

Part (b) of FIG. 10 illustrates an example of the brightness adjustment button, which is formed by a light-emitting indicator 54 and two buttons, namely, an increase button 52a and a decrease button 52b. In this case, each time the decrease button 52b is depressed, the ratio control section 290 decreases the output ratio by a predetermined width, and each time the increase button 52a is depressed, the ratio control section 290 increases the output ratio by a predetermined width. Alternatively, depending on the length of time during which the increase button 52a or the decrease button 52b is depressed, the ratio control section 290 may change the output ratio in a corresponding direction. Further, the brightness reduction operation reception section 288 causes the light-emitting indicator 54 to emit light at maximum brightness when the output ratio is 1.0 and changes the brightness of the light-emitting indicator 54 by a ratio corresponding to a change in the output ratio. According to this UI, it is possible to make fine adjustments not only in the direction of reducing the light emission brightness but also in the direction of increasing the light emission brightness.

Part (c) of FIG. 10 illustrates an example of a brightness adjustment slider, which is formed by a slider 56 and a light-emitting indicator 54. In this case, the ratio control section 290 increases or decreases the output ratio by an amount corresponding to the amount of movement of the slider 56. The light-emitting indicator 54 operates in a manner similar to the manner described in conjunction with part (b). Also in this case, fine adjustments can be made not only in the direction of reducing the light emission brightness but also in the direction of increasing the light emission brightness.

In the cases of part (b) and part (c), in order to allow the user to view the light-emitting indicator 54 and understand a current brightness level, depicted hardware is mounted on the inner wall of the head-mounted display 100 or implemented as an input device that is connected to the head-mounted display 100, for example, with a cable. The light-emitting indicator 54 may be installed separately from the increase button 52a, the decrease button 52b, and the slider 56.

The UI in the brightness reduction operation reception section 288 may be implemented as a software switch. For example, the brightness reduction operation reception section 288 may use the stereo camera 110 and the sensor 162 to detect a specific action performed by the user and recognize the detected action as the brightness reduction operation. For example, the following actions are recognized as the brightness reduction operation.

(1) Holding a Hand Over the Front of the Head-Mounted Display

In this case, the brightness reduction operation reception section 288 detects, from an image captured by the stereo camera 110, that the user has held his/her hand over the front of the head-mounted display 100. For example, when, in the normal mode, the user holds his/her hand once in the above-mentioned manner, the ratio control section 290 makes a transition to the brightness reduction mode by changing the output ratio to a predetermined value smaller than 1.0. If the user holds out his/her hand again in the above-mentioned manner in this state, the ratio control section 290 makes a transition to the normal mode by setting the output ratio back to 1.0.

(2) Tapping the Head-Mounted Display 100

In this case, the brightness reduction operation reception section 288 detects, from the vibration sensor, that the user has tapped the head-mounted display 100 a predetermined number of times within a predetermined period of time that is presumably continuous. If, for example, in the normal mode, the user taps the head-mounted display 100 three times in a row, the ratio control section 290 makes a transition to the brightness reduction mode by changing the output ratio to a predetermined value smaller than 1.0. When the user taps the head-mounted display 100 three times again in this state, the ratio control section 290 returns to the normal mode by changing the output ratio back to 1.0. Alternatively, the output ratio may be changed stepwise depending on the number of taps. Still alternatively, the head-mounted display 100 may be tapped a different number of times so as to choose between the direction of reducing the brightness or the direction of increasing the brightness.

(3) Utterance of a Predetermined Phrase

In this case, the brightness reduction operation reception section 288 uses the microphone and performs speech recognition processing to recognize that the user has uttered a predetermined phrase assigned to each mode, such as "Glary!" or "Restore!" Any of the common techniques may be used for speech recognition. When, in the normal mode, the user utters a phrase corresponding to the transition to the brightness reduction mode, the ratio control section 290 makes a transition to the brightness reduction mode by changing the output ratio to a predetermined value smaller than 1.0. When the user subsequently utters a phrase corresponding to the transition to the normal mode, the ratio control section 290 enters the normal mode by changing the output ratio back to 1.0.

The foregoing examples of the UI assume that a bidirectional transition between the brightness reduction mode and the normal mode is made by the same means of operation. However, the present embodiment is not limited thereto. For example, since brightness needs to be reduced quickly with a simple operation, the emergency button depicted in part (a) of FIG. 10 may be used, and an operation for returning to the normal mode may be performed by using another UI.

Figure 11:
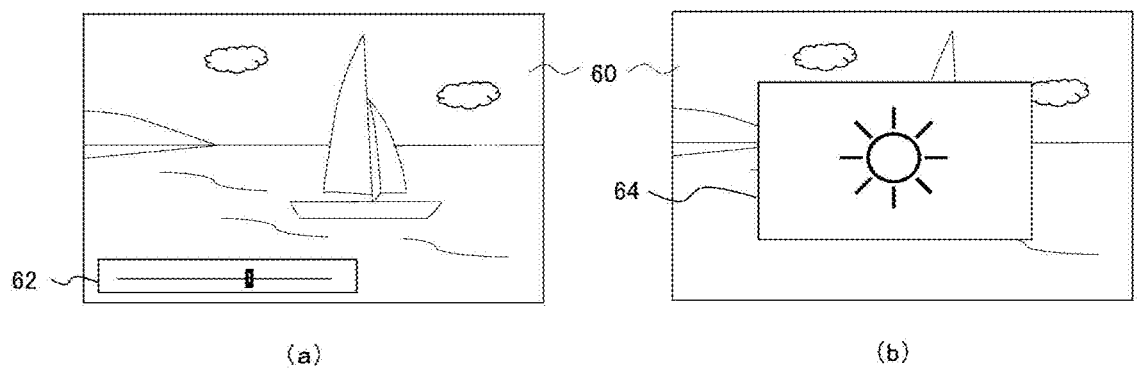
FIG. 11 is a diagram illustrating a brightness adjustment GUI (Graphical User Interface) that is displayed by the brightness reduction operation reception section in the present embodiment.

Further, the brightness reduction operation reception section 288 may display a GUI for brightness adjustment through the display section 286. FIG. 11 illustrates a brightness adjustment GUI that is to be displayed by the brightness reduction operation reception section 288. The brightness reduction operation reception section 288 causes the display panel to display the brightness adjustment GUI when, for example, any of the above-described actions (1) to (3) is detected or when hardware depicted, for example, in FIG. 10 is operated.

In the example depicted in part (a) of FIG. 11, the brightness reduction operation reception section 288 causes a brightness adjustment slider GUI 62 to be displayed and superimposed on an image 60 of currently displayed content. In this case, the brightness reduction operation reception section 288 acquires the amount of operation, for example, by moving a sliding portion of the brightness adjustment slider GUI 62 in correspondence with the movement of the user's head. Alternatively, the brightness reduction operation reception section 288 may acquire a user operation on the brightness adjustment slider GUI 62 from an undepicted input device. In the former case, the brightness reduction operation reception section 288 recognizes the movement of the user's head according to, for example, the values measured by the motion sensor and the movement of the image captured by the stereo camera 110.

When the user moves the sliding portion leftward or rightward, the ratio control section 290 changes the output ratio according to the amount of such a user operation. The brightness of the content image 60 changes when the light emission brightness control section 282 drives the display panel with a voltage corresponding to the changed output ratio. Subsequently, when the user performs a predetermined brightness confirmation operation, the ratio control section 290 confirms the output ratio, and then the brightness reduction operation reception section 288 hides the brightness adjustment slider GUI 62 and ends the reception of brightness adjustment. The brightness confirmation operation is the same as the operation performed, for example, to cause the brightness adjustment slider GUI 62 to appear.

In the example depicted in part (b) of FIG. 11, the brightness reduction operation reception section 288 causes an indicator image 64 to be displayed and superimposed on the image 60 of currently displayed content. In this case, the user increases or decreases the brightness by using, for example, a brightness adjustment button of an undepicted input device. The ratio control section 290 changes the brightness of the indicator image 64 by changing the output ratio according to the amount of brightness adjustment. When the user confirms the brightness of the indicator image 64 and performs the predetermined brightness confirmation operation, the ratio control section 290 confirms the output ratio, and then the brightness reduction operation reception section 288 hides the indicator image 64 and ends the reception of brightness adjustment.

Alternatively, the brightness reduction operation reception section 288 may control the ratio control section 290 to gradually reduce the brightness of the indicator image 64, and, when a predetermined action such as a user's nodding is detected, may stop the gradual brightness reduction of the indicator image 64. In this case, the ratio control section 290 determines the output ratio for providing the resulting brightness as the final value. The user's nodding motion and the like are detected by the brightness reduction operation reception section 288 according to the values measured by the motion sensor and with the image captured by the stereo camera 110. The action of stopping the gradual brightness reduction of the indicator image 64 is not limited to the user's nodding motion, and may be, for example, any of the above-described actions (1) to (3).

In an aspect in which the indicator image 64 is displayed, the content image 60 may be hidden. In any case, even when the UI for brightness adjustment is realized by display, detailed adjustment matching the contents of content may be made by another mechanism so that the adjustment mechanism provided by the brightness reduction operation reception section 288 can be designed specifically for simplicity of operation and reliability of brightness reduction. This is particularly important in a situation where the field of view and the means of operation are limited when the user wears the head-mounted display 100.

Figure 12:
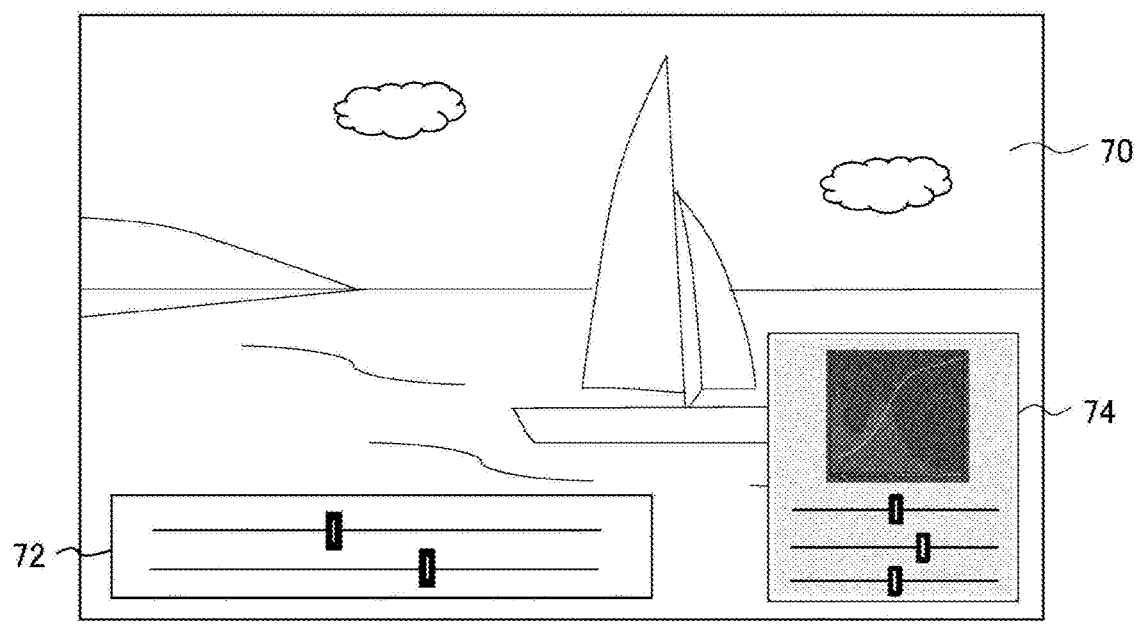
FIG. 12 is a diagram illustrating brightness adjustment UIs that are displayed by a brightness adjustment reception section of the image generation device in the present embodiment.

FIG. 12 illustrates brightness adjustment UIs that are displayed by the brightness adjustment reception section 274 of the image generation device 200. In the example of FIG. 12, a brightness adjustment slider GUI 72 and a tone correction GUI 74 are displayed and superimposed on an image 70 of currently displayed content. The brightness adjustment reception section 274 causes the head-mounted display 100 to display these GUIs when, for example, the image generation device 200 processes content for the first time or the user calls these GUIs.

The brightness adjustment slider GUI 72 has functions similar to those of the brightness adjustment slider GUI 62 depicted in FIG. 11. However, in order to receive operations on more detailed items, the brightness adjustment slider GUI 72 may include multiple slider GUIs. Two slider GUIs are depicted in FIG. 12. For example, one slider GUI is assigned to adjust the brightness of the screen, and the other is assigned to adjust contrast. In this way, the GUI for adjusting the light emission brightness of the display panel and the GUI for adjusting the brightness expressed by pixel values may have a common shape. However, the former provides a simpler operation when the number of pieces of the former is smaller than the number of pieces of the latter.

The upper part of the tone correction GUI 74 depicts the tone curve and a brightness histogram. Meanwhile, the lower part of the tone correction GUI 74 depicts multiple slider GUIs that perform operations such as a level correction operation. Three slider GUIs are depicted in FIG. 12. For example, these three slider GUIs are able to adjust color balance when they are assigned to correct the levels of R, G, and B. However, the contents of FIG. 12 are merely examples. Alternatively, for example, a GUI for directly manipulating the tone curve and a GUI for manipulating hue, saturation, and sharpness may be displayed as needed.

When the user operates the sliding portion of the brightness adjustment slider GUI 72 or the tone correction GUI 74, the brightness adjustment reception section 274 changes the tone curve and other brightness conversion rules and reflects the result of such change on the brightness and tone of the image 70 of currently displayed content. When the user performs a confirmation operation at a time when the user feels that the resulting brightness and tone are appropriate, the brightness adjustment reception section 274 stores various parameters, such as the tone curve, in the brightness conversion rule storage section 268, and hides the brightness adjustment slider GUI 72 and the tone correction GUI 74. Subsequently, the brightness conversion section 266 converts the brightness of the content image in accordance with the rules stored in the brightness conversion rule storage section 268.

In the above example, the user can make detailed settings while viewing the image 70 of actual content. Therefore, the content creator can purposely display images of a scene that is expected to be dark overall and difficult to see, images of a scene that is expected to be difficult to see due to excessive brightness, or images of a scene that is glary, and thus prompt the user to make subjective adjustments. By preparing the adjustment mechanism as part of content in this manner, it is possible to make adjustments that match the characteristics of the content, and in some cases, it is also possible to make adjustments in advance to avoid glare as much as possible.

In this case, it is possible to take measures such as reducing the brightness only in a high-brightness region within a range tolerable by content. This also makes it possible to prevent the brightness from being uniformly reduced by the brightness reduction operation in the head-mounted display 100. The content creator can create content that matches his/her policy with less waste when allowed to freely choose whether or not the content provides a brightness adjustment mechanism, and if so, whether or not to make adjustments to avoid the brightness reduction operation in the head-mounted display 100.

Figure 13:
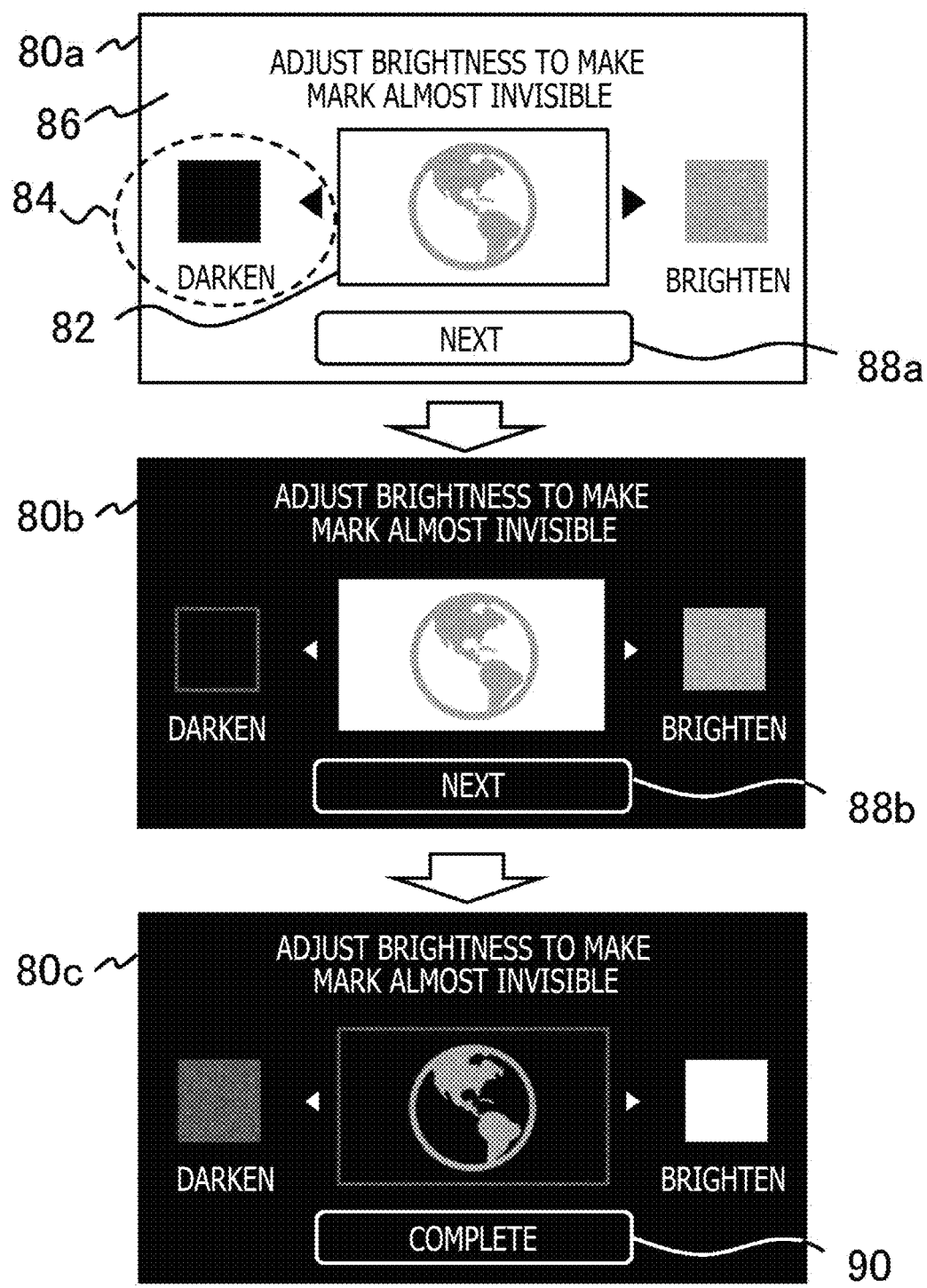
FIG. 13 is a diagram illustrating another brightness adjustment UI that is displayed by the brightness adjustment reception section of the image generation device in the present embodiment.

FIG. 13 illustrates another brightness adjustment UI that is displayed by the brightness adjustment reception section 274 of the image generation device 200. In the example of FIG. 13, the brightness adjustment reception section 274 displays brightness adjustment screens 80*a*, 80*b*, and 80*c*. The brightness adjustment screen 80*a* includes an adjustment target image 82 and pictorial figures (e.g., a pictorial FIG. 84) for associating brightness increase/decrease with directions.

The brightness adjustment screens 80*b* and 80*c* have the similar configuration to the brightness adjustment screen 80*a*. The brightness adjustment reception section 274 changes the brightness of a mark displayed in the adjustment target image 82 in accordance, for example, with a direction designated by the pictorial FIG. 84 and with a period of operation in the designated direction. In the example of FIG. 13, the brightness of lines included in the mark decreases with an increase in the period and degree of a leftward-indicating operation, and the brightness of the lines included in the mark increases with an increase in the period and degree of a rightward-indicating operation. The user depresses either the left or right directional key of an undepicted input device according to an instruction message 86 at the top of the screen that displays "ADJUST BRIGHTNESS TO MAKE MARK ALMOST INVISIBLE" and allows the brightness of the mark to change on the basis of the duration of key depression or the number of key depressions.

Alternatively, the brightness of the mark may be changed according to the duration of a state in which the face of the user is turned leftward or rightward. In this case, the brightness adjustment reception section 274 recognizes such operations based on the values measured by the motion sensor of the head-mounted display 100 and on an image captured by the stereo camera 110. Subsequently, when the user performs a predetermined confirmation operation after having adjusted the brightness until the color of the mark can no longer be distinguished from the background color, the brightness adjustment reception section 274 regards the adjusted brightness as the brightness of a reference color, such as white or black, and stores the brightness of the reference color in the brightness conversion rule storage section 268.

Here, the brightness adjustment screen 80*a* is a screen for defining white brightness (pixel value) on an overall bright screen. The brightness adjustment screen 80*b* is a screen for defining white brightness (pixel value) on an overall dark screen. The brightness adjustment screen 80*c* is a screen for defining black brightness (pixel value). A common display device prevents power consumption from exceeding a specified value by controlling display brightness based on the brightness distribution of an image. Therefore, when an overall bright image is to be displayed as compared to an overall dark image, control is performed to reduce the maximum light emission brightness.

Consequently, when the brightness of white is individually set by using the brightness adjustment screen 80*a* and the brightness adjustment screen 80*b*, the brightness of the content image can be properly controlled by using a tone curve that matches control provided by the display device. When the user designates a GUI 88*a* for proceeding to the next adjustment stage after performing a confirmation operation on the brightness adjustment screen 80*a*, the brightness adjustment reception section 274 displays the brightness adjustment screen 80*b*, which is set as the next adjustment screen. When the user designates a GUI 88*b* for proceeding to the next adjustment stage after completion of adjustment with respect to the brightness adjustment screen 80*b*, the brightness adjustment reception section 274 displays the brightness adjustment screen 80*c*, which is set as the next adjustment screen.

When the user designates a GUI 90 for confirming the completion of adjustment after completion of adjustment with respect to the brightness adjustment screen 80*c*, the brightness adjustment reception section 274 stores the brightness of the reference color confirmed at each stage or the tone curve derived from the brightness of the reference color in the brightness conversion rule storage section 268, and then hides the brightness adjustment screen 80*c*. As a result, images of content to be displayed subsequently are displayed at a brightness suitable for the characteristics of the head-mounted display 100.

The necessity of the above-described adjustment mechanism is also determined for each piece of content in accordance, for example, with the contents to be displayed and with required image definition. That is, as in a case of FIG. 12, the content creator can freely and efficiently create content in accordance with his/her own policy by ensuring that health hazards and discomfort are avoided by the brightness reduction operation in the head-mounted display 100.

According to the present embodiment described above, in a system for processing content and displaying its images on a head-mounted display, an adjustment mechanism for allowing the user to instantly and easily suppress strong light emission from a display panel, which may occur in some scenes, is implemented in the form of light emission brightness control of the display panel. For example, the light emission brightness is uniformly decreased by multiplying a display panel drive voltage by a predetermined ratio. This makes it possible to guarantee that discomfort caused by strong light and the effect of the strong light on physical condition, which are particularly prone to problems with head-mounted displays, are suppressed regardless of the content.

The above-mentioned guarantee provides a rich visual experience over a wide brightness range in most situations including when content images or scenes without high-brightness expressions are displayed and when the user is able to enjoy high-brightness expressions. In a case of content creation, constraints on high-brightness expressions are relaxed so that higher-quality images can be freely created. When a mechanism for adjusting the brightness expressed by pixel values is to be prepared within content, adjustments can be made in a manner suitable for content, for example, by providing a brightness range for important parts through the use of measures, such as a tone curve change, independently of display panel light emission brightness adjustment.

As indicated above, by clearly differentiating the purposes of two types of adjustment mechanisms as well as the characteristics and implementation means of adjustment, it is possible to display images at a quality suitable for content as much as possible while avoiding situations where adjusting one necessitates adjusting the other or sharing information between the two complicates processing. At the time of content creation, it is possible to omit work such as adjusting image quality in consideration of a state where the brightness of the display panel is reduced. Further, since there is no need to incorporate information regarding the display panel's control mechanism and brightness characteristics into the program of content, it is possible to adjust the brightness expressed by pixel values without being affected, for example, by display panel variations or specification changes.

In the present embodiment, the brightness adjustment of the display panel works in a specific situation where light emission is too strong. Therefore, it is possible to combine, without interference, variations of a pixel value brightness adjustment policy defined by content, that is, the variations of whether or not to adjust brightness and what kind of brightness adjustment to make. For example, it is possible to avoid situations where the range of pixel value brightness is increased to negate the reduction of light emission brightness depending on the difference in characteristics, for example, the drive voltage is multiplied by a predetermined ratio for light emission brightness while the brightness expressed by pixel values is adjusted by using the tone curve. As a result, it is easy to simultaneously achieve avoidance of health hazards and image representation in a brightness range optimal for each piece of content.

The present invention has been described above on the basis of the embodiment. It will be understood by persons skilled in the art that the above-described embodiment is illustrative and not restrictive and that the combination of component elements and processes described in conjunction with the embodiment may be variously modified without departing from the spirit and scope of the present invention.

INDUSTRIAL APPLICABILITY

As described above, the present invention is applicable, for example, to various processing devices such as a content processing device, an image generation device, a gaming device, and a display device, and to a system including any of these devices.

REFERENCE SIGNS LIST

100: Head-mounted display
110: Stereo camera
150: Control section
152: Display panel
154: Communication control section
160: Storage section
162: Sensor
200: Image generation device
222: CPU
224: GPU
226: Main memory
234: Storage section
236: Output section
260: Input data acquisition section
262: Image drawing section
264: Drawing data storage section
266: Brightness conversion section
268: Brightness conversion rule storage section
270: Correction section
272: Output section
274: Brightness adjustment reception section
280: Image data acquisition section
282: Light emission brightness control section
284: Output data transmission section
286: Display section
288: Brightness reduction operation reception section
290: Ratio control section

The invention claimed is:
1. An image display system comprising:
an image generation device that processes content to generate a display image; and
a head-mounted display that displays the generated display image, wherein
the image generation device includes
a brightness adjustment reception section that receives a user operation for adjusting brightness expressed by pixel values of the display image, and
a brightness conversion section that converts the brightness expressed by the pixel values of the display image in accordance with rules regarding contents of the user operation received by the brightness adjustment reception section, wherein the brightness conversion section changes a tone curve for brightness conversion according to the user operation for adjusting the brightness expressed by the pixel values, and the head-mounted display includes a brightness reduction operation reception section that receives a user operation for reducing light emission brightness of a display panel displaying the display image, and a light emission brightness control section that controls the light emission brightness of the display panel in accordance with rules regarding contents of the user operation received by the brightness reduction operation reception section;

wherein the light emission brightness control section decreases the light emission brightness of the display panel to a predetermined ratio according to the user operation for reducing the light emission brightness.

2. The image display system according to claim 1, wherein the brightness reduction operation reception section detects a specific action of a user through a sensor included in the head-mounted display and thus recognizes the detected specific action as a user operation for reducing the light emission brightness.

3. The image display system according to claim 2, wherein the brightness reduction operation reception section detects the specific action in a state where the light emission brightness is reduced, and thus recognizes the detected specific action as a user operation for restoring the light emission brightness to an original level.

4. The image display system according to claim 2, wherein the brightness reduction operation reception section detects, as the specific action, a user action of holding a user's hand over the front of the head-mounted display, tapping the head-mounted display, or uttering a predetermined phrase.

5. The image display system according to claim 1, wherein the brightness reduction operation reception section recognizes depression of an emergency button included in the head-mounted display as the user operation for reducing the light emission brightness.

6. The image display system according to claim 1, wherein the brightness reduction operation reception section gradually reduces brightness of an indicator image displayed on the head-mounted display and thus detects a predetermined user action of stopping the gradual brightness reduction, and the light emission brightness control section controls the light emission brightness of the display panel according to the brightness of the indicator image at a time of detection of the predetermined user action.

7. The image display system according to claim 1, wherein the brightness adjustment reception section receives the user operation for adjusting the brightness expressed by the pixel values through a brightness adjustment user interface defined by content to be processed, and the brightness reduction operation reception section receives the user operation for reducing the light emission brightness through a brightness adjustment user interface common to the content.

8. The image display system according to claim 1, wherein the brightness reduction operation reception section recognizes depression of an emergency button as the user operation for reducing the light emission brightness.

9. The image display system according to claim 1, wherein said image generation device and said head-mounted display are separate devices connected wirelessly, through a Universal Serial Bus (USB), through another peripheral device, or to a server through a network.

10. The image display system according to claim 1, wherein the brightness reduction operation reception section comprises a hardware switch.

11. The image display system according to claim 1, wherein the brightness conversion section converts the brightness expressed by the pixel values of the display image using tone mapping processing.

12. The image display system according to claim 1, wherein the image generation device adjusts pixel brightness according to a tone map, and wherein the head-mounted display adjusts a possible brightness range of the pixel values.

13. A head-mounted display comprising:

a display section that causes a display panel to display an image with light emission brightness corresponding to pixel values;

a brightness reduction operation reception section that receives a user operation for reducing light emission brightness of the display panel; and a light emission brightness control section that decreases the light emission brightness of the display panel to a predetermined ratio according to the user operation for reducing the light emission brightness, wherein the user operation is received by a brightness adjustment reception section of an image generation device, and wherein the head-mounted display is configured to receive, from the image generation device, image data having pixel values that are adjusted according to a tone curve for brightness conversion in response to the user operation.

14. An image display method comprising:

causing an image generation device to process content to generate a display image;

causing the image generation device to receive a user operation for adjusting brightness expressed by pixel values of the display image;

causing the image generation device to convert the brightness expressed by the pixel values of the display image in accordance with rules regarding contents of the user operation for adjusting the brightness expressed by the pixel values;

wherein the image generation device changes a tone curve for brightness conversion according to the user operation for adjusting the brightness expressed by the pixel values, causing a head-mounted display to receive a user operation for reducing light emission brightness of a display panel displaying the display image; and causing the head-mounted display to control the light emission brightness of the display panel in accordance with rules regarding contents of the user operation for reducing the light emission brightness;

wherein the head-mounted display decreases the light emission brightness of the display panel to a predetermined ratio according to the user operation for reducing the light emission brightness.

15. A non-transitory computer-readable information storage medium for storing a program for causing a computer to:

by a display section, causing a display panel to display an image with light emission brightness corresponding to pixel values;

by a brightness reduction operation reception section, receiving a user operation for reducing light emission brightness of the display panel; and by a light emission brightness control section, decreasing the light emission brightness of the display panel to a predetermined ratio according to the user operation for reducing the light emission brightness, wherein the user operation is received by a brightness adjustment reception section of an image generation device, and wherein the computer is configured to receive, from the image generation device, image data having pixel values that are adjusted according to a tone curve for brightness conversion in response to the user operation.

* * * * *